United States Patent [19]

Steinwart et al.

[11] 4,011,032
[45] Mar. 8, 1977

[54] SYSTEM FOR LIQUID COOLING OF A ROTOR OR A ROTARY MECHANISM

[75] Inventors: Johannes Steinwart, Obersulm-Willsbach; Armin Bauder, Neckarsulm; Wulf Leitermann, Bad Wimpfen, all of Germany

[73] Assignee: Audi NSU Auto Union Aktiengesellschaft, Neckarsulm, Germany

[22] Filed: Feb. 4, 1976

[21] Appl. No.: 655,013

[30] Foreign Application Priority Data

Mar. 21, 1975 Germany .................. 2512425

[52] U.S. Cl. .................. 418/84; 123/41.13; 418/87; 418/91
[51] Int. Cl.² .................. F01C 21/06
[58] Field of Search .......... 418/84, 88, 94, 91, 418/87; 184/6.5, 6.22, 6.1; 123/41.13, 41.05, 41.39; 417/282, 292, 228

[56] References Cited

UNITED STATES PATENTS

| | | | |
|---|---|---|---|
| 1,230,460 | 6/1917 | Brush | 184/6.5 |
| 1,463,644 | 7/1923 | Winton | 123/41.39 |
| 1,688,076 | 10/1928 | Grayson | 123/41.39 |
| 1,882,716 | 10/1932 | Angle | 184/6.5 |
| 2,800,119 | 7/1957 | Schmidl | 184/6.5 |
| 3,131,679 | 5/1964 | Peras | 418/88 |
| 3,176,915 | 4/1965 | Bentele et al. | 418/88 |
| 3,176,916 | 4/1965 | Sollinger | 418/91 |
| 3,521,610 | 7/1970 | Coudriet | 123/41.05 |
| 3,834,843 | 9/1974 | Stoltman et al. | 418/84 |
| 3,841,803 | 10/1974 | Morgan et al. | 418/84 |
| 3,876,345 | 4/1975 | Froede et al. | 418/84 |

FOREIGN PATENTS OR APPLICATIONS 975,780  11/1974  United Kingdom ............ 123/41.13

Primary Examiner—William L. Freeh
Assistant Examiner—Leonard Smith
Attorney, Agent, or Firm—Arthur Frederick; Victor D. Behn

[57] ABSTRACT

The improved system for liquid cooling of a rotor of a rotary piston mechanism applies to those types having two housing walls spaced apart by a trochoidal shaped peripheral wall to define a multi-lobed cavity within which a multi-cornered rotor is eccentrically supported for planetary movement, and in which the rotor has a hub portion and peripheral wall portions defining therebetween cooling spaces which communicate with the area exteriorly of the rotor through an opening adjacent each end of the hub portion. The improved rotor cooling system comprises a cooling liquid discharge nozzle disposed in at least one of the housing walls and connecting the discharge nozzle to a source of pressurized cooling liquid. The discharge nozzle is positioned so as to direct emitted cooling liquid into the adjacent rotor opening and the cooling spaces in the rotor.

In a narrower aspect of the invention a regulator and valve assembly is provided to control flow of cooling liquid to the discharge nozzle in accordance with the pressure conditions of the cooling liquid and temperature and load operating conditions of the engine.

7 Claims, 8 Drawing Figures

FIG. 8
FIG. 7
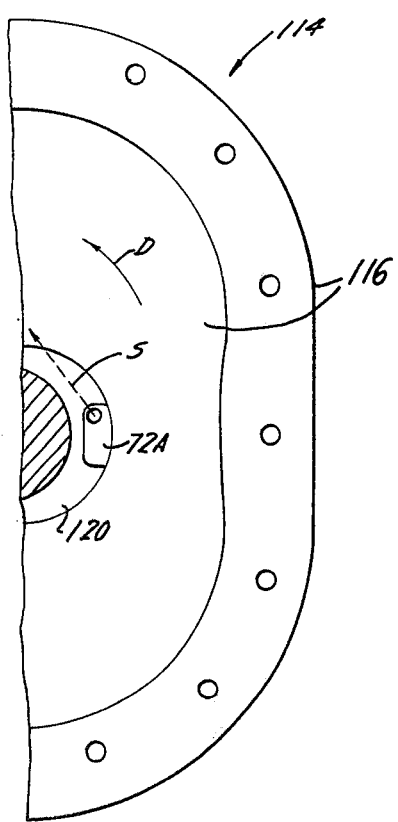
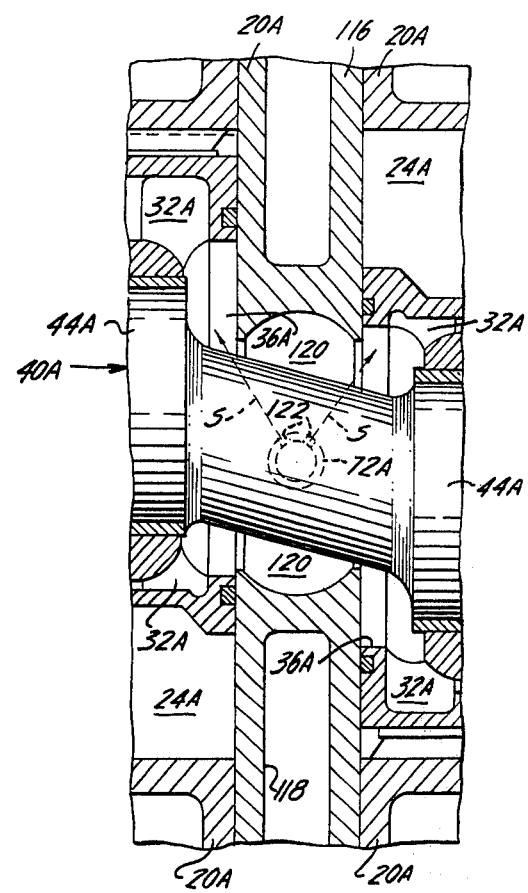

SYSTEM FOR LIQUID COOLING OF A ROTOR OR A ROTARY MECHANISM

The invention relates to cooling rotary piston mechanisms of the trochoidal type such as disclosed in the U.S. pat. to Wankel et al., U.S. Pat. No. 2,988,065 and more particularly to an improved system for liquid cooling of the rotors of such rotary mechanisms.

BACKGROUND OF THE INVENTION

In rotary piston mechanisms of the trochoidal type having a multi-lobed housing cavity defined by two housing walls spaced apart by a trochoidal shaped peripheral wall and within which a multi-cornered rotor is eccentrically supported for planetary movement, it is well known to employ a rotor having cavities between the hub and flank portions which cavities communicate exteriorly of the rotor through openings in the faces of the rotor and to cool the rotor by spraying liquid utilized for lubricating the shaft and rotor bearings into the rotor cavities. Such a rotary mechanism is exemplified in the U.S. patent to Bentele et al., U.S. Pat. No. 3,176,915, wherein a nozzle is carried in the eccentric portion of the drive shaft and in communication with a lubricant supply channel to direct lubricant into the rotor cavities to effect cooling of the rotor. Since the nozzle is constantly open, lubricant is sprayed into the rotor regardless of the operating temperatures of the mechanism. This functional condition retards the rapid rise of the mechanism to the desired operating temperature and results in high fuel consumption. Furthermore, because cooling liquid (lubricant) is continuously emitted by the nozzle into the cavities of the rotor, it is possible, at low speeds and idling conditions, to cause a build-up of a high, detrimental pressure of the liquid lubricant so that inadequate lubrication of the shaft and rotor bearings may occur.

One suggested solution to the aforementioned problems is exemplified in Japanese Pat. No. 47-14481 wherein the lubricant supply to the cooling nozzle is regulated by a thermostatically controlled valve in the rotor. The valve is a pivotal bushing which closes or opens the supply passage to the nozzle under the urging of a thermostat. It has been found that such an installation is not reliable because it is mounted in the rotor and is, therefore, subjected to centrifugal stresses. Moreover, the function of the thermostatically controlled valve is not observable and to effect repairs to the device would necessitate extensive and expensive disassembly and assembly work. The present invention, therefore, seeks to avoid the aforementioned disadvantages of presently known rotor cooling systems of the type utilizing liquid lubricant as a coolant.

Accordingly, one object of the present invention is to provide an improved rotor cooling system employing liquid lubricant which is capable of regulation in accordance with load, operating temperature and coolant pressure.

It is another object of this invention to provide an improved rotor cooling system employing liquid lubricant which is readily accessible for inspection and repair.

A further object of this invention is to provide an improved rotor cooling system employing lubricant as a coolant that has operating reliability.

SUMMARY OF THE INVENTION

Accordingly, the present invention contemplates an improved rotor cooling system for a rotary piston mechanism of the Wankel et al type having a multi-lobed housing cavity defined by two housing walls spaced apart by a trochoidal shaped peripheral wall and having a multi-cornered rotor supported eccentrically on a mainshaft for planetary movement within the housing cavity, the rotor being constructed to have cavities therein between its hub and flank portions which cavities communicate with the exterior of the rotor through openings in the faces of the rotor in the regions adjacent the hub portion.

The improved rotor cooling system comprises a source of pressurized cooling fluid, such as liquid lubricant, and at least one stationary discharge nozzle disposed in one of the housing walls. The nozzle is in communication with the source of pressurized cooling fluid, through suitable passages, to receive pressurized cooling fluid. The nozzle is positioned so as to emit a stream of cooling fluid toward and into an opening in the rotor face and the cavities of the rotor. This disposition of the discharge nozzle in a stationary location enables the separation of cooling function of the lubricant from its bearing lubrication function.

In a narrower aspect of this invention, a regulator and valve assembly is provided to control flow of cooling fluid to the discharge nozzle in accordance with the pressure conditions of the cooling fluid and the temperature and load on the rotary mechanism. The regulator and valve assembly is located to be accessible exteriorly of the rotary mechanism and capable of inspection and repair without disassembly of the rotary mechanism. Therefore, not only can the lubricating and cooling functions be controlled independently, but the function of the system can be monitored, inspected and repaired simply and easily.

In a still narrower scope of the invention, the regulator and valve assembly comprises a pressure responsive valve located in a coolant fluid supply passageway, a temperature sensing member disposed to sense the temperature of the rotary mechanism and means interconnecting the valve and temperature sensing means together and with a load control mechanism, such as an accelerator control means. The pressure responsive valve functions to open the coolant fluid supply passageway when such lubricant coolant fluid has reached a predetermined pressure which, when the pressure is produced by a pump driven by the rotary mechanism, is proportionate to engine speed. When the coolant pressure has reached the predetermined pressure value, the valve will not open until the temperature sensing member senses that the rotary mechanism has reached a predetermined temperature value and a load above that at idle. Thus, coolant is only discharged into the rotor cavities when lubricant coolant pressure is at a pedetermined value and the temperature and load of the rotary mechanism is at predetermined values. This insures proper lubricant supply to the bearings under all operating conditions as well as rotor cooling only when required.

In another embodiment of the invention the improved cooling system is applied to a multi-rotor rotary mechanism.

BRIEF DESCRIPTION OF THE DRAWINGS

The above and other objectives and advantages of the present invention will appear more fully hereinafter from a consideration of the detailed description which follows when taken together with the accompanying drawings wherein one embodiment of the invention is illustrated.

FIG. 7 is a fragmentary view in cross-section taken along line 7—7 of FIG. 6; and FIG. 8 is a fragmentary, cross-sectional view through the joint between the intermediate wall and an adjacent trochoidal housing wall of the rotary piston mechanism shown in FIGS. 6 and 7, the view being on a smaller scale than FIGS. 6 and 7.

DESCRIPTION OF THE PREFERRED EMBODIMENTS

Figure 6:
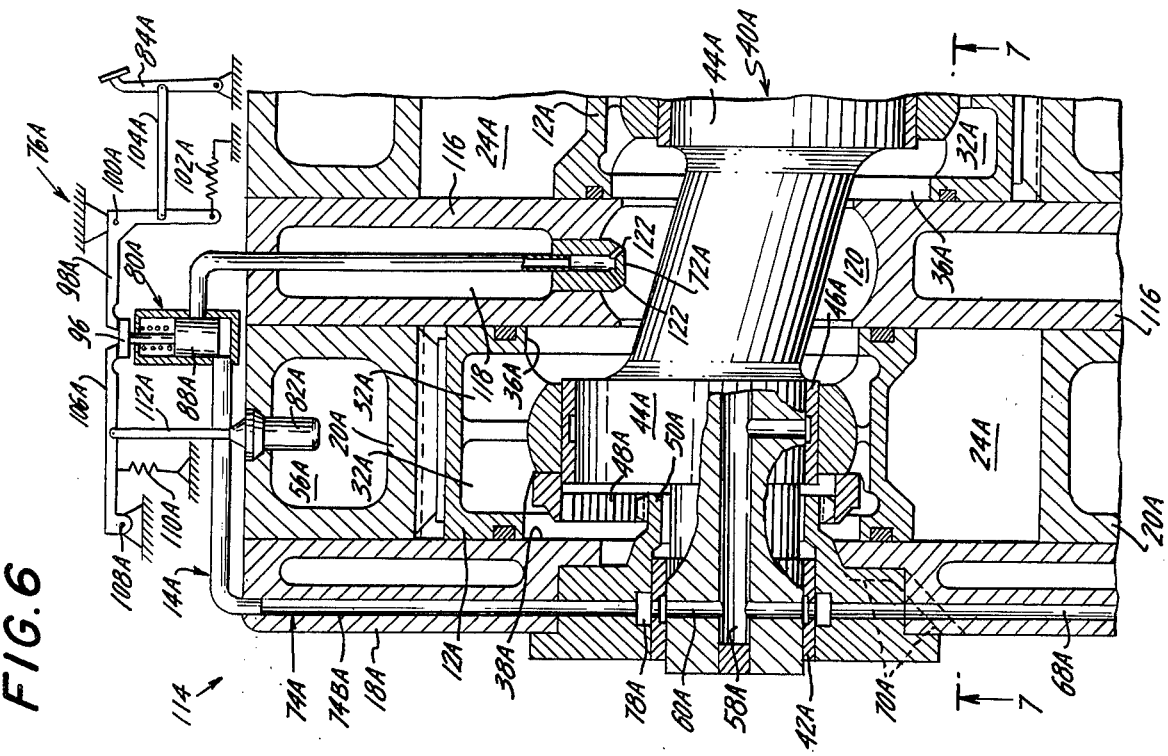
FIG. 6 is a fragmentary view in cross-secton, similar to FIG. 1, showing the improved rotor cooling system of this invention as applied to a multi-rotor rotary piston mechanism.

Now referring to the drawing and more specifically FIGS. 1 to 5, the reference number 10 generally designates a rotary piston mechanism having a single rotor 12 and an improved rotor cooling system 14 according to a first embodiment of this invention.

The rotary piston mechanism 10 is of the conventional Wankel type which comprises, in addition to rotor 12, a housing having two end walls 16 and 18 held in spaced parallel relationship by a peripheral wall 20. The peripheral wall 20 has an inner surface 22 of trochoidal configuration so that the end walls 16 and 18 define with the peripheral wall, a trochoidal shaped, multi-lobed cavity 24.

The rotor 12 has a multi-cornered profile (not shown) and comprises a hub portion 26 and radially spaced peripheral or flank portions 28, the hub and flank portions being interconnected by circumferentially spaced radial ribs or webs 30 to thereby define between the hub and flank portions 26 and 28 a plurality of cooling cavities or spaces 32. The end faces 34 of the rotor have openings 36 in the region adjacent hub portion 26 to communicate cooling spaces 32 with the interstices between the rotor faces 34 and the adjacent inner surfaces 38 of end walls 16 and 18. The rotor 12 is supported in housing cavity 24 by a mainshaft 40.

The mainshaft 40 is journaled for rotation in bearings 42 disposed in end walls 16 and 18. The mainshaft has an eccentric portion 44 which supports, through a bearing 46 in the hub portion 26, rotor 12 for planetary rotation within cavity 24.

To maintain the angular relationship between rotor 12 and the housing as the rotor planetates within cavity 24, an internal gear 48 is carried by rotor 12 in meshing relationship to a fixed pinion gear 50 secured to end wall 18.

The end walls 16 and 18 are each provided with recesses 52 in the inner wall surface 38 in the area adjacent bearings 42. Also, end walls 16 and 18 may be provided with fluid cooling passageways or jackets 54. Similarly, peripheral wall 20 has a cooling fluid passageway or jacket 56.

As is conventional, lubrication is supplied to bearings 42 and 46 and timing gears 48 and 50 by means of passageways in the housing and mainshaft. More specifically, the lubricating system may comprise a sealed, central bore 58 and radial bores 60 extending from bore 58 to an annulus in each of the bearings 42 and 46. The bore 58 is supplied with lubricant, such as oil, from a suitable source of pressurized lubricant. One such source might, as shown in phantom lines, be a sump 62 and a pump 64 driven by the mainshaft 40. The pump 64 is connected to a suction passageway 66 which draws lubricant from sump 62. A feed passageway 68 communicates at one end with the discharge side of pump 64 and at the other end with bore 58 via radial passages 60. As shown, feed passageway 68 may include a channel in end wall 18, a distribution annulus 78 surrounding bearing 42 and a hole 77 in bearing 42 communicating annulus 78 with the adjacent radial bores 60. The lubricant supplied under pressure by pump 64 after lubricating bearing 42 and 46, leaks into the areas surrounding the timing gears and recesses 52 from when the lubricant is returned to sump 62 via return passage 70. To utilize the lubricant to also effect cooling of rotor 12, the improved rotor cooling system 14 of this invention is provided in the previously described rotary piston mechanism.

The improved rotor cooling system 14 comprises essentially a stationary discharge nozzle 72, a lubricant supply passageway 74 communicating discharge nozzle 72 with lubricant feed passageway 68 to receive lubricant from the latter, and a regulator and valve assembly 76.

Figure 1:
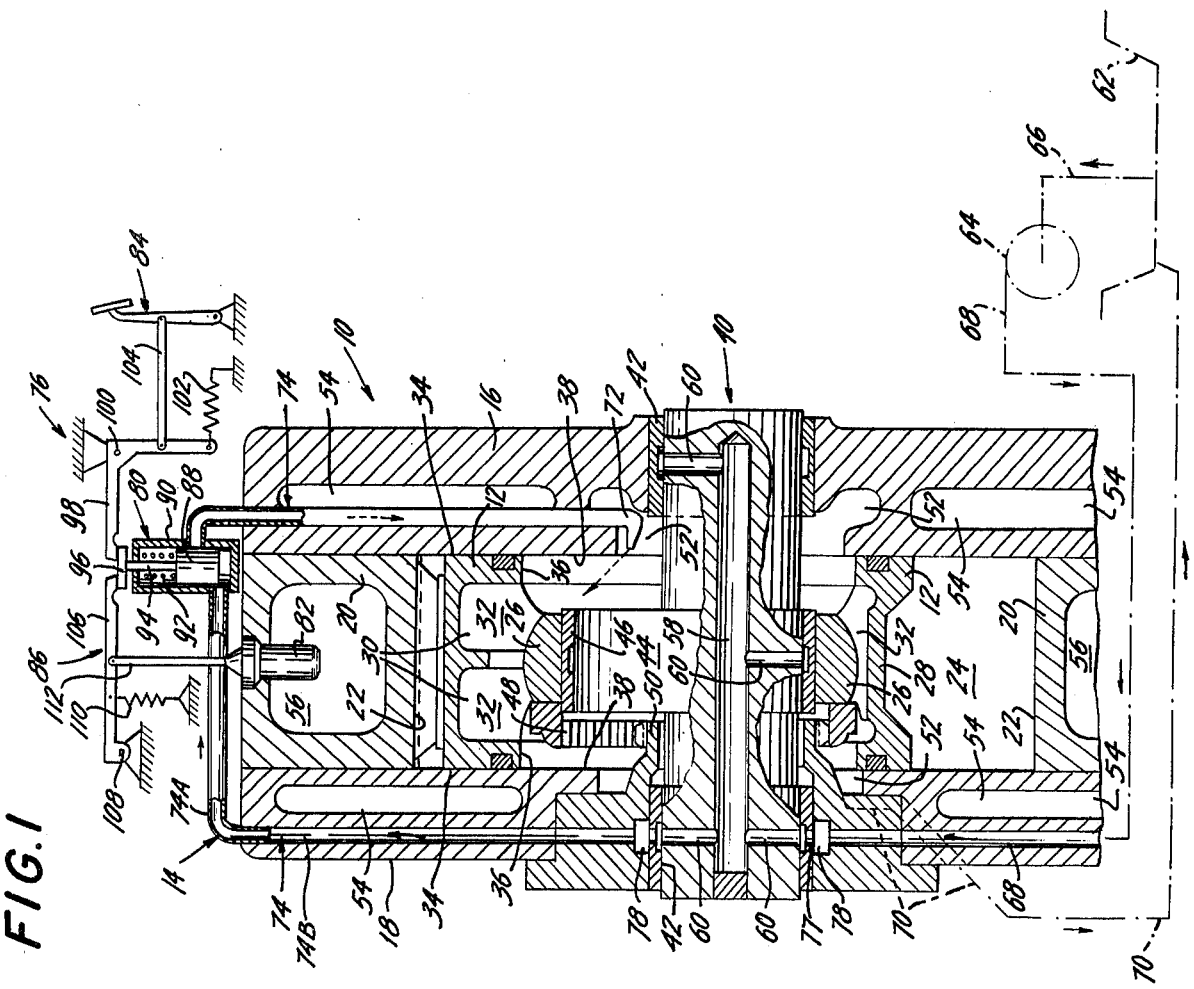
FIG. 1 is a fragmentary view in cross-section of a rotary piston mechanism having a single rotor and an improved rotor cooling system according to this invention.

As shown in FIG. 1, discharge nozzle 72 is disposed in end wall 16 with its distal end located in recess 52 in end wall 16. The discharge nozzle 72 is so positioned that the emitted stream of lubricant is directed, as indicated by the arrow, in the direction of rotor rotation and into opening 36 in rotor face 34 and cooling spaces 32.

The lubricant supply passageway 74 includes a tubular portion 74A extending exteriorly of the mechanism housing and a channel 74B in end wall 18. The end of channel 74B from tubular portion 74A communicates with distribution annulus 78 which annulus is supplied with lubricant by lubricant feed passageway 68.

The regulator and valve assembly 76 is schematically shown in the drawings and comprises a valve 80 disposed in tubular portion 74A of the lubricant supply passageway 74, a temperature sensing member 82, a load control device 84 and an interconnecting means 86 connecting the load control device and temperature sensing member with valve 80.

The valve 80, for illustration purposes is shown as a piston-cylinder type valve, but the invention is not limited to this type of valve. Any suitable valve which is responsive to fluid pressure may be employed in the regulator and valve assembly 76. As shown, valve 80 comprises a piston or plunger 88 which is disposed for reciprocative movement in a cylinder 90 to control flow of lubricant through inlet and outlet ports which communicate with tubular portions 74A. The piston 88 is biased in a closed direction by a spring 92. The spring is selected to exert a biasing force sufficient to maintain piston 88 in the closed position of FIG. 1 until the lubricant pressure in the valve reaches a predetermined value at which the force exerted on piston 88 overcomes the force exerted by spring 92. A piston rod 94 extends from piston 88 through housing 90 and terminates externally of the housing in a cap 96.

The interconnecting means 86 for connecting load control device 84 and temperature sensing member 82 with value 80 may comprise, as shown, two linkage assemblies. One of the linkage assemblies is an L-shaped link 98, pivotally connected at 100 and having one arm biased in contact with cap 96 of piston 88 by a spring 102 connected to the other arm of the link. The link 98 is connected, via a suitable means such as a link 104, to load control device 84. The other linkage assembly comprises a lever 106 which is pivotally supported at one end at 108 and, at the opposite end, biased in contact with cap 96 of piston 88 by a spring 110. To connect lever 106 with the temperature sensing member 82 a link 112 is provided. The link 112 is pivotally connected at one end to lever 106 and at the opposite end to temperature sensing member 82 to be axially moved by the latter.

The regulator and valve assembly 76 of the improved rotor cooling system 10 is shown in FIG. 1 in an initial or basic position wherein the rotary piston mechanism has just been cold-started and the pump 64 has not yet elevated the lubricant fluid to the predetermined pressure necessary to move piston 88 of valve 80 to the open position and permit flow of lubricant to discharge nozzle 72. In this position, lubrication is conducted to bearings 42 and 46 and the leakage of lubricant from the bearings supplies lubrication to timing gears 48 and 50. With no lubricant being sprayed from discharge nozzle 72, the entire mechanism will quickly attain its desired operating temperature while the bearings and gears are assured the required lubrication. Obviously, at this time the rotor is only cooled by lubricant leakage from bearings 42 and 46.

Figure 2:
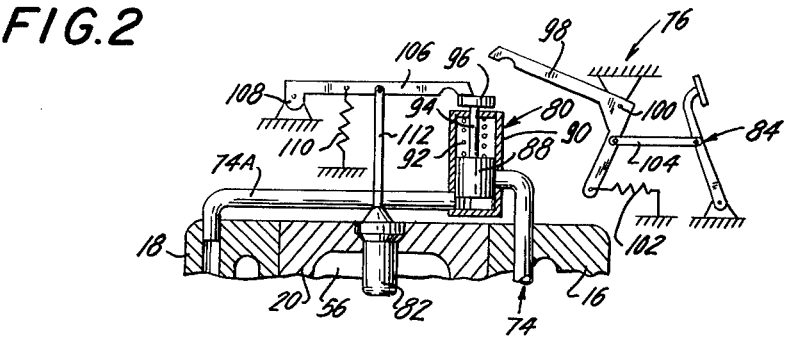
FIGS. 2 to 5 are fragmentary views showing various other operative positions of the regulator and valve assembly shown in FIG. 1 and which assembly forms part of the improved rotor cooling system of this invention.

If, as shown in FIG. 2, the mechanism 10 is accelerated above idle, link 98 is pivotally moved out of contact with cap 96 of piston 88, but piston 88 cannot move to an open position in spite of increasing lubricant pressure in valve 80 because lever 106 continues to hold piston 88 against movement. This insures that no lubricant is delivered to discharge nozzle 72 for cooling purposes until the proper operating temperature is reached.

Figure 3:
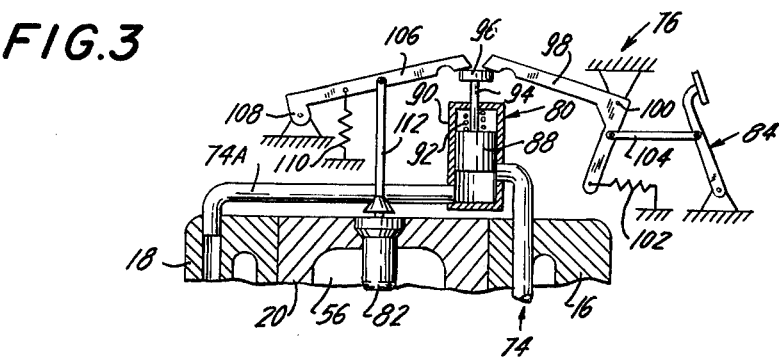

As shown in FIG. 3 with continued operation of mechanism 10 and the attendant increase in its temperature to the desired predetermined temperature, as sensed by temperature sensing member 82, lever 106 is caused to pivot out of engagement with cap 96 of piston 88. With both the lever 106 and link 98 actuated in a direction away from valve 80, piston 88 is permitted to move under the force of the lubricant pressure in valve 80. If the lubricant pressure is at the predetermined pressure, or above, to overcome the force of spring 92, and load control device 84 remains in the approximately full load position as shown in FIGS. 2 and 3, piston 88 will be moved to an open position, thus permitting flow of lubricant, through tubular portion 74A, to discharge nozzle 72. From discharge nozzle 72 the pressurized lubricant is sprayed into cooling spaces 32 of rotor 12. As herein described, lubricant cooling of rotor 12 is fully provided for only after the mechanism reaches the desired operational temperature, at a predetermined minimum lubricant pressure and when the mechanism speed is above idling.

Figure 4:
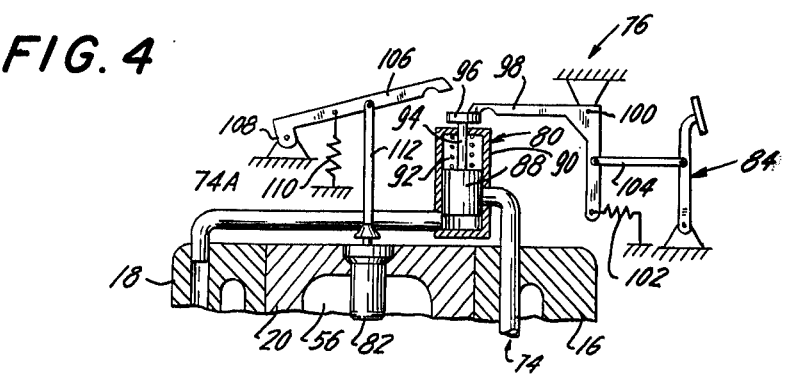

In FIG. 4 is illustrated the position of regulator and valve assembly 76 when the mechanism is at its desired operational temperature, but the mechanism load is at or returns to an idle condition. With regulator and valve assembly 76 in the position shown in FIG. 3 and a reduction in load on the mechanism to the idle condition, the load change will be reflected in a movement of load control device 84 in a clockwise direction which, in turn, pivots link 98 in a direction toward valve 80 and forces piston 88 of valve 80 to the closed position shown in FIG. 4. The closing of the flow of cooling lubricant to discharge nozzle 72 avoids the possibility, at low loads, of excessive cooling of rotor 12, but maintains delivery of lubricant to bearings 42 and 46 and timing gears 48 and 50.

Figure 5:
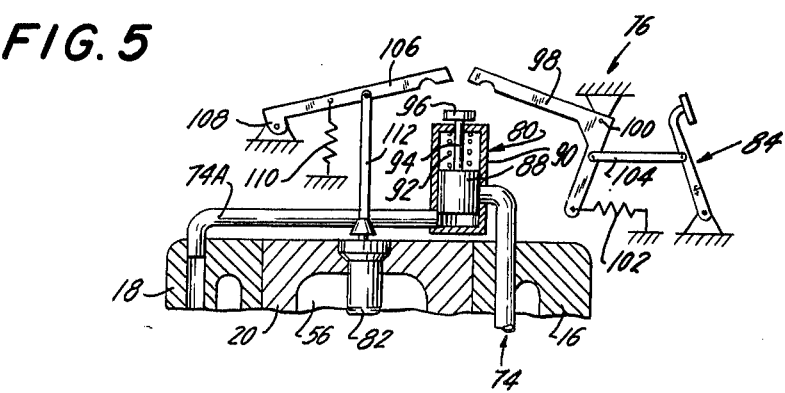

In FIG. 5 is illustrated the operational condition of regulator and valve assembly 76 when the operating temperature, as sensed by temperature sensing member 82, is at the desired value and the mechanism is operating at a load range above idle, but the lubricant pressure is not at the selected minimum pressure. In this position, piston 88 of valve 80 remains in a closed position and no lubricant is delivered to discharge nozzle 72 for cooling the rotor. This operative condition can occur where at low engine speed pump 64 is pumping only a small amount of lubricant resulting in a correspondingly low pressure. This operation may occur only briefly during normal operation of mechanism 10 and therefore no appreciable rise in rotor temperature is likely to occur so that lubricant cooling of rotor 12 is not essential. Here again lubrication of bearing 42 and 46 and timing gears 48 and 50 is assured.

The temperature sensing member 82 need not be installed in peripheral wall 20 (as shown) where it is exposed to cooling liquid in cooling jacket 56, but may be installed in some other suitable place where it can reliably sense the operating temperature of the mechanism and is readily accessible for inspection and repair. The temperature sensing member may, for example, alternately be located in end wall 18 in the region of return passage 70.

A further alternative is the installation of a second discharge nozzle 72 in end wall 18 and with its distal end in recess 52 in end wall 18. Thus, two discharge nozzles 72 would direct cooling lubricant into cooling spaces 32 from opposite sides of rotor 12. Also, in such arrangement the flow of lubricant to each of the discharge nozzles 72 can be controlled by a common valve 80.

In FIGS. 1, 2, 3, 4 and 5 are shown extreme positions of regulator and valve assembly 72, and therefore it is to be understood that there are other intermediate positions wherein less than maximum quantities of lubricant are passed to discharge nozzle 72 for cooling rotor 12, which quantities are proportionate to the lubricant pressure above its selected minimum value, the mechanism temperature above the predetermined minimum value, and load operating conditions above the predetermined load settings. Thus, the improved rotor cooling system 14 provides for cooling of rotor 12 in direct proportion to the cooling requirements as determined by the lubricant pressure conditions and the temperature and load operating conditions of the mechanism.

In FIGS. 6, 7 and 8 is shown a second embodiment of the improved cooling system 14A as applied to a rotary piston mechanism 114 of the multi-rotor type. Since the improved cooling system 14A only differs in the location of the discharge nozzle and that such nozzle serves to simultaneously cool two adjacent rotors 12A, parts of the embodiment shown in FIGS. 6 to 8 corresponding to like parts in the embodiment shown in FIG. 1 will be designated by the same reference numeral but with the Suffix A added thereto.

The multi-rotor, rotary piston mechanism 114 comprises, as shown, two rotors 12A supported on two spaced eccentric portions 44A of a mainshaft 40A for rotation in housing cavities 24A which are spaced apart by an intermediate wall 116. Similar to housing walls 18A and 20A, intermediate wall 116 is provided with a cooling jacket or passages 118. The intermediate wall 116 has a central opening 120 through which mainshaft 40A extends and into which opening, according to this invention, extends a liquid lubricant discharge nozzle 72A. The flow of cooling lubricant to discharge nozzle 72A is controlled by the same regulator and valve assembly 76A previously described herein. Also, the same source of pressurized lubricant for lubrication and cooling purposes may be the same as the previously described sump 62 and pump 64, (shown in FIG. 1, but not shown in FIG. 6), connected to passages 68A and 70A. The discharge nozzle 72A is provided with at least two outlet orifices 122 for directing streams of lubricant to cooling cavities or spaces 32A of rotors 12A.

As best illustrated in FIGS. 7 and 8, outlet orifices 122 of discharge nozzle 72A are so positioned as to direct a stream of cooling lubricant, as shown by arrows S, into cooling spaces 32A of pistons 12A and with each of the streams angled in the same direction as rotor rotation shown by the arrow D in FIG. 8. This location of each of the outlet orifices 122 insures uninterrupted injection of lubricant into cooling spaces 32A of rotors 12A as they planetate in their respective housing cavities 24A. FIGS. 7 and 8 also can serve to illustrate the direction (arrows S) of the coolant lubricant stream emitted from discharge nozzle 72 of the embodiment shown in FIG. 1.

It is believed now readily apparent that the present invention provides an improved rotor cooling system for a rotary piston mechanism of the Wankel type wherein rapid rise of mechanism temperature to the predetermined optimum operating temperature is achieved from a cold start; where over-cooling of the rotor while idling is obviated; where undesirable over-pressurization of the lubricant is avoided; and where lubrication of the rotor bearings and timing gears is assured for all operating conditions of the mechanism.

Although several embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. In a rotary piston mechanism having a housing comprising two housing walls spaced apart by a peripheral wall to define a multi-lobe, trochoidal-shaped cavity and a rotor eccentrically supported for planetary movement within said cavity and which rotor has a hub portion and peripheral wall portions defining cooling spaces therebetween which communicate with the area exteriorly of the rotor through an opening adjacent each end of the hub portion, an improved rotor cooling system comprising:
   a. a pressurized source of cooling fluid;
   b. at least one discharge nozzle communicating through a supply passage means with said source of pressurized cooling fluid;
   c. said nozzle being disposed in one of said housing walls and positioned so as to emit a stream of cooling fluid toward and into said opening in the rotor and the cooling spaces therein; and
   d. means for controlling flow of cooling fluid through the supply passage means and to the discharge nozzle in accordance with the pressure conditions of the cooling fluid, and the temperature and load operating conditions of the mechanism.

2. The apparatus of claim 1 wherein said flow controlling means is a regulator and valve assembly which is operative at predetermined temperature and pressure values to permit flow and to stop flow below those predetermined values and at small load operating conditions of the mechanism.

3. The apparatus of claim 1 wherein said means for controlling cooling fluid flow is a regulator and valve assembly.

4. The system of claim 3 wherein said regulator and valve assembly is accessible exteriorly of the mechanism without disassembly of the latter.

5. The apparatus of claim 2 wherein the regulator and valve assembly comprises:
   a. a valve operative in one position to prevent flow of cooling fluid through the supply passage, and operable to another position upon a pre-determined coolant fluid pressure to permit flow of cooling fluid through the supply passage;
   b. a temperature sensing member in the housing of said mechanism to sense the temperature of the mechanism;
   c. load control device operative in response to load on the mechanism; and
   d. interconnecting means for connecting said temperature sensing member and said load control device with said valve so as to maintain said valve or move said valve toward its closed position at a predetermined minimum mechanism temperature or at a predetermined minimum mechanism load.

6. In a rotary piston mechanism having a housing comprising a plurality of cavities each of which is defined by at least one intermediate wall, a peripheral wall of trochoidal configuration and an end wall, a rotor supported on an eccentric portion of a mainshaft within each cavity so that the rotor planetates within its associated cavity, the mainshaft being supported to extend through an opening in the intermediate wall, each of said rotors having a hub portion and peripheral wall portions to define therebetween a plurality of cooling spaces which communicate with the opening in the intermediate wall through an opening in the rotor adjacent the hub portion and said intermediate wall opening, an improved rotor cooling system comprising:
   a. a pressurized source of cooling fluid;
   b. at least one discharge nozzle means disposed in the intermediate wall and communicating through a supply passage means with said pressurized source of cooling fluid to receive the same;
   c. said discharge nozzle having discharge ports in said intermediate wall opening positioned to direct streams of cooling fluid into the openings and the cooling spaces in each of the rotors located adjacent said intermediate wall; and
   d. control means for regulating flow of cooling fluid through the supply passage means and to the discharge nozzle in accordance with the pressure conditions of the cooling fluid and the temperature and load operating conditions of the mechanism.

7. The apparatus of claim 6 wherein said control means is a regulator and valve assembly.

* * * * *